United States Patent
Avila et al.

(10) Patent No.: US 12,481,498 B2
(45) Date of Patent: Nov. 25, 2025

(54) SOFTWARE CODE VERIFICATION USING SOFTWARE CODE IDENTIFIER COMPARISON

(71) Applicant: Dell Products L.P., Round Rock, TX (US)

(72) Inventors: Daniel Toralles Avila, Porto Alegre (BR); Vicente Eliseu da Rosa, Imbé (BR); Sakthivel Govindasamy, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/940,452

(22) Filed: Sep. 8, 2022

(65) Prior Publication Data

US 2024/0086183 A1    Mar. 14, 2024

(51) Int. Cl.
  *G06F 8/71*   (2018.01)
(52) U.S. Cl.
  CPC ...................... *G06F 8/71* (2013.01)
(58) Field of Classification Search
  CPC ......................................................... G06F 8/71
  USPC ....................................................... 717/122
  See application file for complete search history.

(56) References Cited

U.S. PATENT DOCUMENTS

| | | | | |
|---|---|---|---|---|
| 8,768,962 | B2* | 7/2014 | Laron | G06F 16/1734 707/706 |
| 9,386,037 | B1* | 7/2016 | Hunt | H04L 63/1433 |
| 11,119,754 | B1* | 9/2021 | Sun | G06F 8/65 |
| 11,222,091 | B2* | 1/2022 | Liu | G06F 8/71 |
| 11,327,744 | B2* | 5/2022 | Rodrigues Rosa Junior | G06F 16/137 |
| 11,443,047 | B2* | 9/2022 | Sekhar | G06F 21/60 |
| 11,586,433 | B2* | 2/2023 | Hoenzsch | G06F 21/54 |
| 11,797,639 | B2* | 10/2023 | Liu | G06F 8/38 |
| 2004/0210885 | A1* | 10/2004 | Wang | G06F 8/71 717/130 |

(Continued)

OTHER PUBLICATIONS

Knittl-Frank, Daniel. "Analysis and comparison of distributed version control systems." Bachelorarbeit, University of Applied Sciences, Upper Austria (2010). (Year: 2010).*

(Continued)

*Primary Examiner* — Matthew J Brophy
(74) *Attorney, Agent, or Firm* — Ryan, Mason & Lewis, LLP

(57) ABSTRACT

Techniques are provided for software code verification using a comparison of software code identifiers. One method comprises obtaining a first software code identifier for a first version of software code, wherein the first software code identifier is obtained by applying a function to the first version of the software code; comparing a second software code identifier to the first software code identifier, wherein the second software code identifier is obtained by applying the function to a second version of the software code; and performing an automated action based on a result of the comparison. The comparison may detect a difference between the first and second versions of the software code. The first version of the software code may comprise software code associated with a first stage of a software development cycle and the second version of the software code may comprise software code associated with a different stage.

20 Claims, 8 Drawing Sheets

(56) References Cited

U.S. PATENT DOCUMENTS

| | | | | |
|---|---|---|---|---|
| 2005/0257205 | A1* | 11/2005 | Costea | G06F 8/65 |
| | | | | 717/168 |
| 2008/0068153 | A1 | 3/2008 | Doan et al. | |
| 2008/0269938 | A1 | 10/2008 | Meaney et al. | |
| 2012/0324435 | A1* | 12/2012 | Somani | G06F 8/30 |
| | | | | 717/170 |
| 2013/0055231 | A1* | 2/2013 | Hyndman | G06F 8/658 |
| | | | | 717/169 |
| 2013/0066901 | A1* | 3/2013 | Marcelais | G06F 16/137 |
| | | | | 707/769 |
| 2013/0173530 | A1* | 7/2013 | Laron | G06F 16/176 |
| | | | | 707/608 |
| 2014/0089185 | A1* | 3/2014 | Desai | G06Q 10/067 |
| | | | | 705/41 |
| 2014/0282400 | A1* | 9/2014 | Moorthi | G06F 9/45558 |
| | | | | 717/122 |
| 2015/0113638 | A1 | 4/2015 | Valasek et al. | |
| 2015/0324178 | A1* | 11/2015 | Arnold | G06F 8/48 |
| | | | | 717/121 |
| 2016/0034267 | A1* | 2/2016 | Wetzold | G06F 8/60 |
| | | | | 717/172 |
| 2017/0003958 | A1* | 1/2017 | Okubo | G06F 9/44505 |
| 2017/0286544 | A1* | 10/2017 | Hunt | H04L 63/123 |
| 2018/0004953 | A1* | 1/2018 | Smith, II | H04L 9/3268 |
| 2018/0189690 | A1* | 7/2018 | Chan | G06F 8/20 |
| 2018/0191764 | A1* | 7/2018 | Chawla | G06F 16/951 |
| 2018/0205560 | A1 | 7/2018 | Park et al. | |
| 2019/0155598 | A1* | 5/2019 | Bainville | G06F 8/658 |
| 2019/0303623 | A1* | 10/2019 | Reddy | G06F 8/71 |
| 2019/0305959 | A1* | 10/2019 | Reddy | G06F 8/73 |
| 2019/0306173 | A1* | 10/2019 | Reddy | H04L 63/0281 |
| 2019/0394050 | A1 | 12/2019 | Goeringer et al. | |
| 2020/0379752 | A1* | 12/2020 | Rodrigues Rosa Junior | |
| | | | | G06F 16/9014 |
| 2020/0394235 | A1* | 12/2020 | Liu | G06F 8/38 |
| 2021/0021428 | A1* | 1/2021 | Landman | G06F 8/60 |
| 2021/0021633 | A1* | 1/2021 | Landman | H04L 63/1433 |
| 2021/0326454 | A1* | 10/2021 | Sekhar | H04L 9/3239 |
| 2022/0092137 | A1* | 3/2022 | Liu | G06F 16/958 |
| 2022/0164452 | A1* | 5/2022 | Landman | G06F 16/9027 |
| 2022/0171840 | A1 | 6/2022 | Balin et al. | |
| 2022/0283801 | A1* | 9/2022 | Hoenzsch | G06F 21/54 |
| 2023/0014438 | A1* | 1/2023 | Jones | G06F 8/77 |
| 2023/0325080 | A1* | 10/2023 | Huo | G06F 11/1441 |
| 2023/0376603 | A1* | 11/2023 | Yaron | G06F 8/71 |
| 2024/0086183 | A1* | 3/2024 | Avila | G06F 8/71 |

OTHER PUBLICATIONS

"Sga256sum(1)—Linux man page"; https://linux.die.net/man/1/sha256sum, downloaded Aug. 30, 2022.

"How toSHA256SUM"; https://help.ubuntu.com/community/HowToSHA256SUM, downloaded Aug. 30, 2022.

"What is Secure Hashing Algorithm? What is SHA Used for?" https://www.encryptionconsulting.com/education-center/what-is-sha/#:~:text=SHA%20stands%20for%20secure%20hashing,modular%20additions%2C%20and%20compression%20functions, downloaded Aug. 30, 2022.

U.S. Appl. No. 17/210,799 entitled "System Protection Using Verification of Software Digital Identity Values", filed Mar. 24, 2021.

Cooper, David et al. "BIOS Protection Guidelines" https://nvlpubs.nist.gov/nistpubs/Legacy/SP/nistspecialpublication800-147.pdf; downloaded on Sep. 6, 2022.

Hoffman, Chris; "How to Secure Your Computer with a BIOS or UEFI Password"; Updated Jul. 12, 2017; https://www.howtogeek.com/186235/how-to-secure-your-computer-with-a-bios-or-uefi-password/; downloaded on Sep. 6, 2022.

Lewis, Nick; How to Bolster Security to Prevent BIOS Attacks; published Nov. 2011; https://searchsecurity.techtarget.com/answer/How-to-bolster-BIOS-security-to-prevent-BIOS-attacks; downloaded on Sep. 6, 2022.

Rashid, Fahmida Y.; "Dell BIOS Verification Extents Security Focus"; Feb. 5, 2016; https://www.infoworld.com/article/3029728/dell-bios-verification-extends-security-focus.html; downloaded on Sep. 6, 2022.

Rajdeep; "Hardware Verification Using Software Analyzers"; http://www.kroening.com/papers/ISVLSI2015-1.pdf; downloaded on Nov. 24, 2020.

\* cited by examiner

SOFTWARE CODE VERIFICATION USING SOFTWARE CODE IDENTIFIER COMPARISON

FIELD

The field relates generally to information processing systems and more particularly, to the processing of software code in such systems.

BACKGROUND

A number of techniques exist for developing and making changes to software code. GitHub, for example, provides a software development platform that enables communication and collaboration among software developers. The software development platform provided by GitHub allows software developers to create new software versions of software without disrupting a current version. A software development project typically generates multiple versions of software code, each associated, for example, with a different stage of the software development project.

SUMMARY

In one embodiment, a method comprises obtaining a first software code identifier value for a first version of software code, wherein the first software code identifier value is obtained by applying a function to the first version of the software code; comparing a second software code identifier value to the first software code identifier value, wherein the second software code identifier value is obtained by applying the function to a second version of the software code; and performing one or more automated actions based at least in part on a result of the comparison.

In some embodiments, the first version of the software code comprises software code associated with a first stage of a software development cycle and the second version of the software code comprises software code associated with a different stage of the software development cycle. The applying the function to the first version of the software code may be performed at a first time and the applying the function to the second version of the software code may be performed at a different time. For example, the first software code identifier value may be generated at a first time associated with a completion of the first stage and the second software code identifier value may be generated at a second time associated with a completion of the different stage.

In one or more embodiments, the comparison detects a difference between the first version of the software code and the second version of the software code.

Other illustrative embodiments include, without limitation, apparatus, systems, methods and computer program products comprising processor-readable storage media.

DETAILED DESCRIPTION

Figure 1:
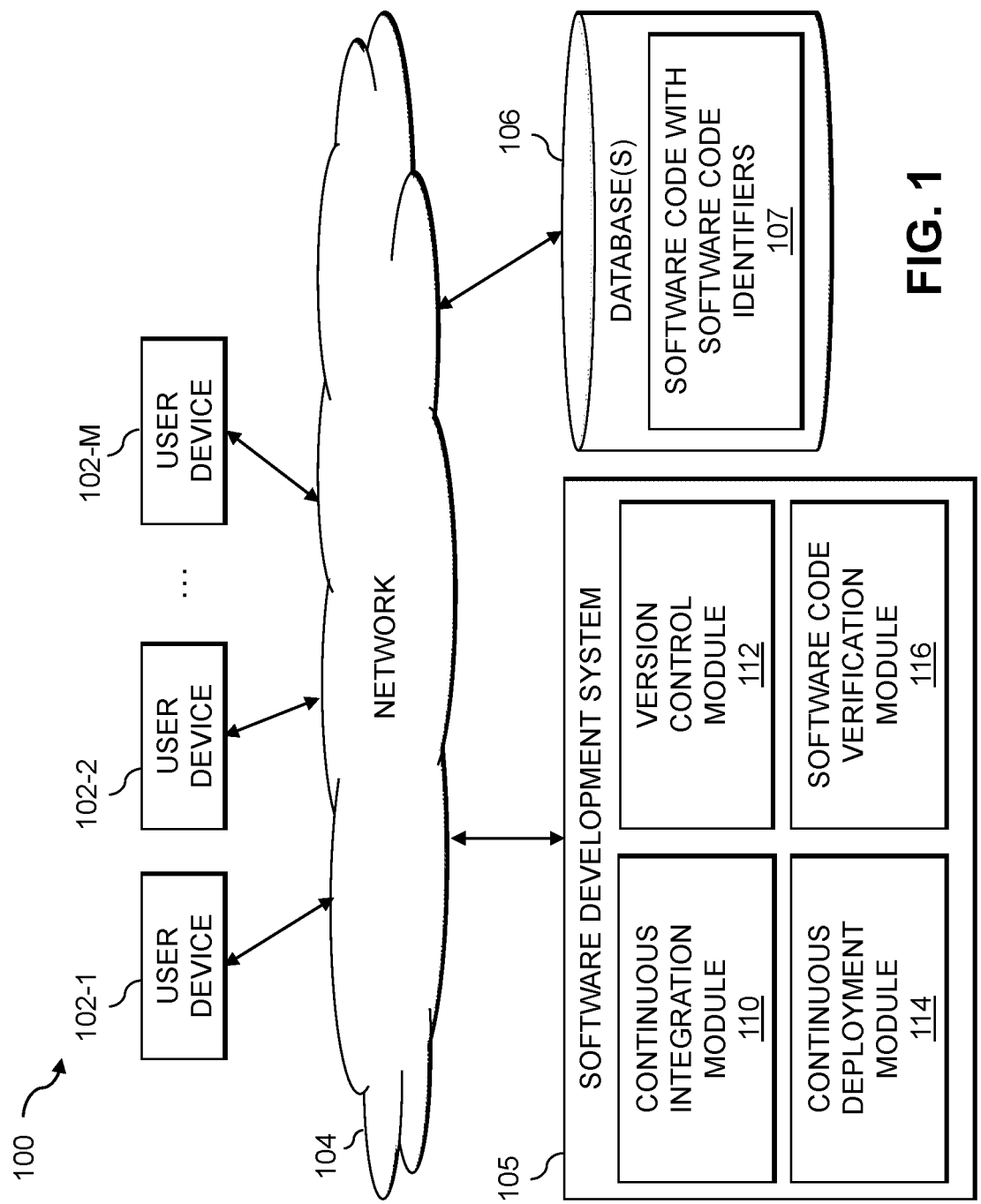
FIG. 1 illustrates an information processing system configured for software code verification using a comparison of software code identifiers, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for software code verification using a comparison of software code identifiers.

The term DevOps generally refers to a set of practices that combines software development and information technology (IT) operations. DevOps are increasingly being used to shorten the software development lifecycle and to provide continuous integration, continuous delivery, and continuous deployment. A software development lifecycle comprises a process for planning, creating, testing, and deploying software code (e.g., associated with an application). Continuous integration (CI) generally allows development teams to merge and verify changes more often by automating software builds (e.g., converting source code files into stand-alone software components that can be executed on a computing device) and software tests, so that errors can be detected and resolved early. Continuous deployment (CD) allows code changes that pass an automated testing phase to be automatically released into a production environment, thus making the changes visible to end users.

In a software development environment, it is often important to verify that the software code of an application that has been deployed and tested in non-production environments is the same software code that was released into a production environment. For example, it may be important to detect when an untested version of software code, such as a malware version of software code, was deployed into a production environment. Such verification is important to ensure the security, compliance and/or stability of any CI/CD process, and to protect the software code and related data assets.

Software code verification imposes a number of technical challenges for DevOps and cybersecurity organizations. The software code for a given application, for example, may comprise a large number of individual pieces of software code, and each piece of software code may need to be verified against the original source code to ensure that the production software is authentic. It is often very difficult and time-consuming, however, to reliably compare multiple versions of software code, line by line. It may also be vulnerable to errors, since any differences between multiple versions of software code may cause false positives while performing the verification task.

In one or more embodiments of the present disclosure, software code verification techniques are provided that apply a function to multiple versions of software code associated with a particular software development project, for example. The function, such as a hash function, generates a substantially unique identifier value for each different version of the software code. The multiple versions of the software code may each be associated with a different stage of a software development lifecycle. The unique identifier values for the different software code versions can be compared to detect an unexpected, untested and/or anomalous version of the software code.

While one or more embodiments are described herein in the context of verifying multiple versions of software code developed and deployed using a CI/CD process, the disclosed software code verification techniques may be employed to evaluate multiple versions of software code developed in any manner. Accordingly, the term "software code," as used herein, is intended to be broadly construed, so as to encompass, for example, any of a wide variety of forms of generating different versions of software code, as would be apparent to a person of ordinary skill in the art.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 may be employed, for example, by software developers and other DevOps professionals to perform, for example, software development and/or software deployment tasks. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a software development system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The software development system 105 comprises a continuous integration module 110, a version control module 112, a continuous deployment module 114 and a software code verification module 116. Exemplary processes utilizing modules 110, 112, 114 and/or 116 will be described in more detail with reference to, for example, the flow diagrams of FIGS. 2, 4 and 6.

In at least some embodiments, the continuous integration module 110, the version control module 112 and the continuous deployment module 114, or portions thereof, may be implemented using functionality provided, for example, by commercially available DevOps and/or CI/CD tools, such as the GitLab development platform, the GitHub development platform, the Azure DevOps server and/or the Bitbucket CI/CD tool, or another DevOps and/or CI/CD tool. The continuous integration module 110, the version control module 112 and the continuous deployment module 114 may be configured, for example, to perform CI/CD tasks and to provide access to DevOps tools and/or repositories. The continuous integration module 110 provides functionality for automating the integration of software code changes from multiple software developers or other DevOps professional into a single software project.

In one or more embodiments, the version control module 112 manages versions of software code and other aspects of a repository composition available from the DevOps and/or CI/CD tool. Source code management (SCM) techniques are used to track modifications to a source code repository. In some embodiments, SCM techniques are employed to track a history of changes to a software code base and to resolve conflicts when merging updates from multiple software developers.

The continuous deployment module 114 manages the automatic release of software code changes made by one or more software developers from a software repository to a production environment, for example, after validating the stages of production have been completed. The continuous deployment module 114 may interact in some embodiments, with a software testing system to coordinate the testing of software code and/or verify a successful testing of software code.

In at least some embodiments, the software code verification module 116 includes functionality for the generation and/or comparison of software code identifier values for different versions of software code, as discussed further below in conjunction with FIGS. 3 through 6.

It is to be appreciated that this particular arrangement of modules 110, 112, 114 and/or 116 illustrated in the software development system 105 of the FIG. 1 embodiment is presented by way of example only, and alternative arrangements can be used in other embodiments. For example, the functionality associated with the modules 110, 112, 114 and/or 116 in other embodiments can be combined into a single module, or separated across a larger number of modules. For example, the software code verification module 116 may be implemented in other embodiments as a dedicated server. As another example, multiple distinct processors can be used to implement different ones of the modules 110, 112, 114 and/or 116 or portions thereof.

At least portions of modules 110, 112, 114 and/or 116 may be implemented at least in part in the form of software that is stored in memory and executed by a processor.

A software testing system (not shown in FIG. 1) may comprise a testing module that performs one or more software tests within a software development lifecycle, as would be apparent to a person of ordinary skill in the art. Generally, software testing aims to ensure that bugs and other software code errors are detected as soon as possible and are remedied before being exposed to end users. A test version of a particular software code is typically processed by the software testing system.

Additionally, the software development system 105 can have at least one associated database 106 configured to store data pertaining to, for example, software code 107 of at least one application, along with the corresponding software code identifiers for each version of the software code. For example, the at least one associated database 106 may correspond to at least one code repository that stores one or more versions of the software code 107 and corresponding software code identifiers. In such an example, the at least one code repository may include different snapshots or versions of the software code 107, along with the corresponding software code identifiers, at least some of which can correspond to different branches of the software code 107 used for different development environments (e.g., one or more testing environments, one or more staging environments, and/or one or more production environments).

Also, at least a portion of the one or more user devices 102 can also have at least one associated database (not explicitly shown in FIG. 1). As an example, such a database can maintain a particular branch of the software code 107 and corresponding software code identifier that is developed in a sandbox environment associated with a given one of the user devices 102. Any changes associated with that particular branch can then be sent and merged with branches of the software code 107 maintained in the at least one database 106, for example.

An example database 106, such as depicted in the present embodiment, can be implemented using one or more storage systems associated with the software development system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the software development system 105 are one or more input-output devices, which illustratively comprise keyboards, displays or other types of input-output devices in any combination. Such input-output devices can be used, for example, to support one or more user interfaces to the software development system 105, as well as to support communication between software development system 105 and other related systems and devices not explicitly shown.

Additionally, the software development system 105 in the FIG. 1 embodiment is assumed to be implemented using at least one processing device. Each such processing device generally comprises at least one processor and an associated memory, and implements one or more functional modules for controlling certain features of the software development system 105.

More particularly, the software development system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the software development system 105 to communicate over the network 104 with the user devices 102, and illustratively comprises one or more conventional transceivers.

It is to be understood that the particular set of elements shown in FIG. 1 for software development system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software development system 105 and the database(s) 106 can be on and/or part of the same processing platform.

Figure 2:
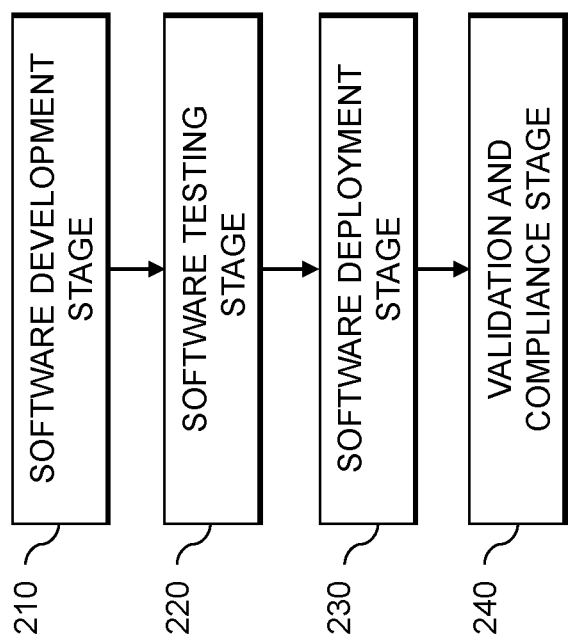
FIG. 2 shows an example of a software development lifecycle in an illustrative embodiment.

FIG. 2 shows an example of a software development lifecycle in an illustrative embodiment. A software development lifecycle is comprised of a number of stages 210 through 240. In the example of FIG. 2, a software development stage 210 comprises generating (e.g., writing) the software code for a given application. During a software testing stage 220, the software code generated for the given application in the software development stage 210 is deployed into a test environment, such as a non-production environment, to test and approve (or not) the software code generated in the software development stage 210.

If the software code is approved during the software testing stage 220, then the software code advances to a software deployment stage 230 that deploys the software code of the application to a production environment. Finally, a validation and compliance stage 240 comprises one or more steps to validate a deployment, for example, based at least in part on the needs of a given organization.

One or more aspects of the disclosure recognize that there is an assumption that the same piece of software code generated during the software development stage 210 is tested in the software testing stage 220 and is deployed in the software deployment stage 230, following a successful testing process. In at least some embodiments, a software code identifier may be evaluated during the validation and compliance stage 240 for the software code associated with each of the software development stage 210, the software testing stage 220 and the software deployment stage 230. The validation and compliance stage 240 may employ the software code verification module 116, for example, to compare at least two of the different software code identifiers to verify that the corresponding versions of the software code are the same. If the software code identifiers for the at least two stages are not the same, then there is potentially untested, unauthorized and/or malicious software code being deployed into a production system.

Figure 3:
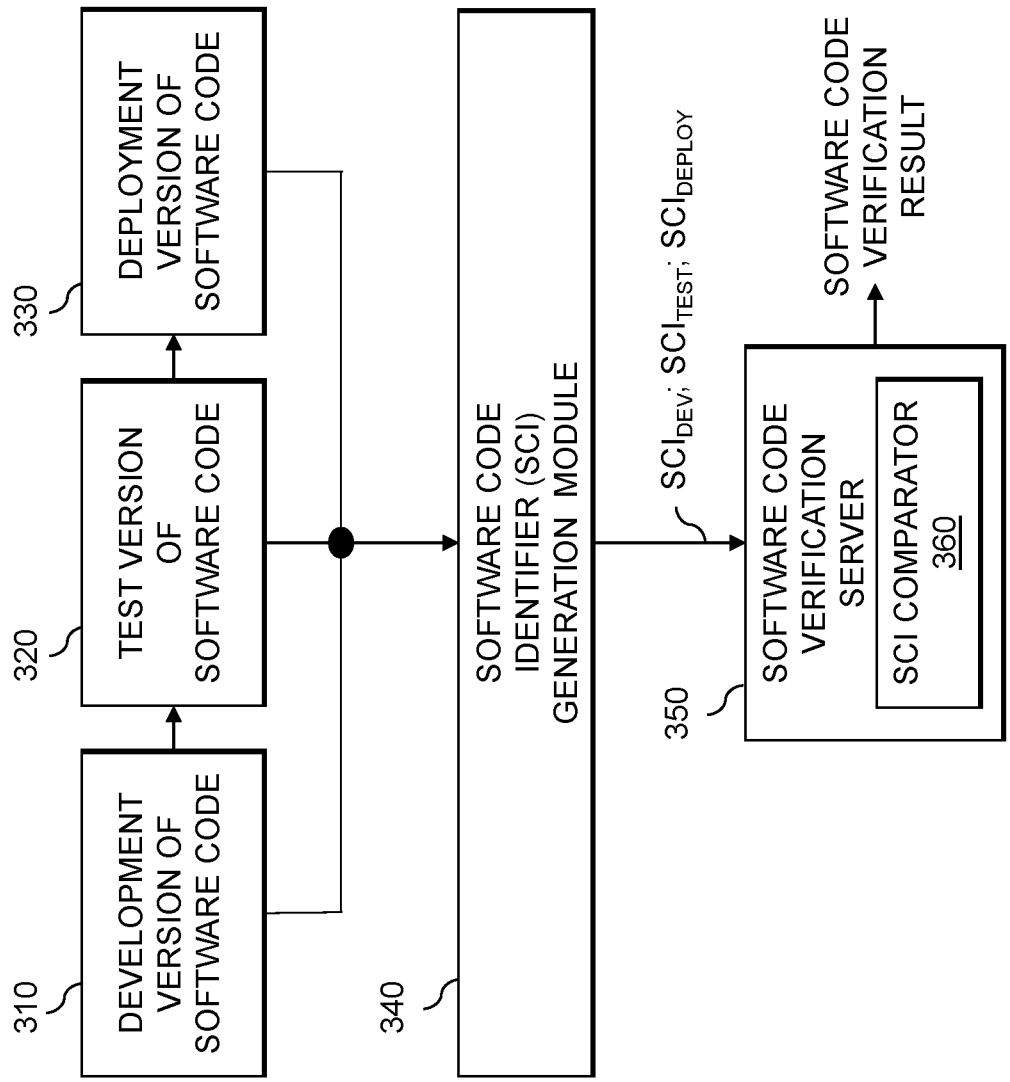
FIG. 3 illustrates a software code verification server configured for software code verification using a comparison of software code identifiers, in accordance with an illustrative embodiment.

FIG. 3 illustrates a software code verification server 350 configured for software code verification using a comparison of software code identifiers, in accordance with an illustrative embodiment. In the example of FIG. 3, following a development of software code, a development version 310 of the software code is deployed into a test environment as a test version 320 of the software code. If the software code is approved during the software testing stage, then the software code is deployed to a production environment as a deployment version 330 of the software code. In at least some embodiments, following a completion of each of the development, testing and deployment stages, a software code identifier (SCI) is generated by an SCI generation module 340 for each of the corresponding versions 310, 320, 330 of the software code. The SCI generation module 340 may apply a hash function, for example, to each of the versions 310, 320, 330 of the software code to obtain corresponding SCIs: $SCI_{DEV}$, $SCI_{TEST}$, and $SCI_{DEPLOY}$. The Secure Hash Algorithm (e.g., SHA-1 or SHA-2), for example, is one cryptographic hash function that is applied to an input and produces a hash value. In other embodiments, the SCI generation module 340 may apply a different hash function or another function that generates a substantially unique identifier for an applied input.

The SCI generation module 340 may be integrated in some embodiments with the software development system 105 to automatically generate SCIs for respective software code versions following the completion of each of the development, testing and deployment stages, for example. In this manner, any update to software code stored in a code repository, or deployed to a test or production environment, should automatically generate a new SCI for any updated software code versions. The SCI generation module 340 may employ, for example, the sha256sum data integrity verification program, that uses the SHA-2 family of hash functions.

As shown in FIG. 3, the software code verification server 350 receives two or more of the SCIs generated by the SCI generation module 340 (e.g., two or more of $SCI_{DEV}$, $SCI_{TEST}$, and $SCI_{DEPLOY}$) and employs an SCI comparator 360 to compare at least two of the SCIs (e.g., $SCI_{DEV}$, $SCI_{TEST}$, and/or $SCI_{DEPLOY}$) and to generate a corresponding software code verification result indicating whether the corresponding versions of the software code are the same.

Figure 4:
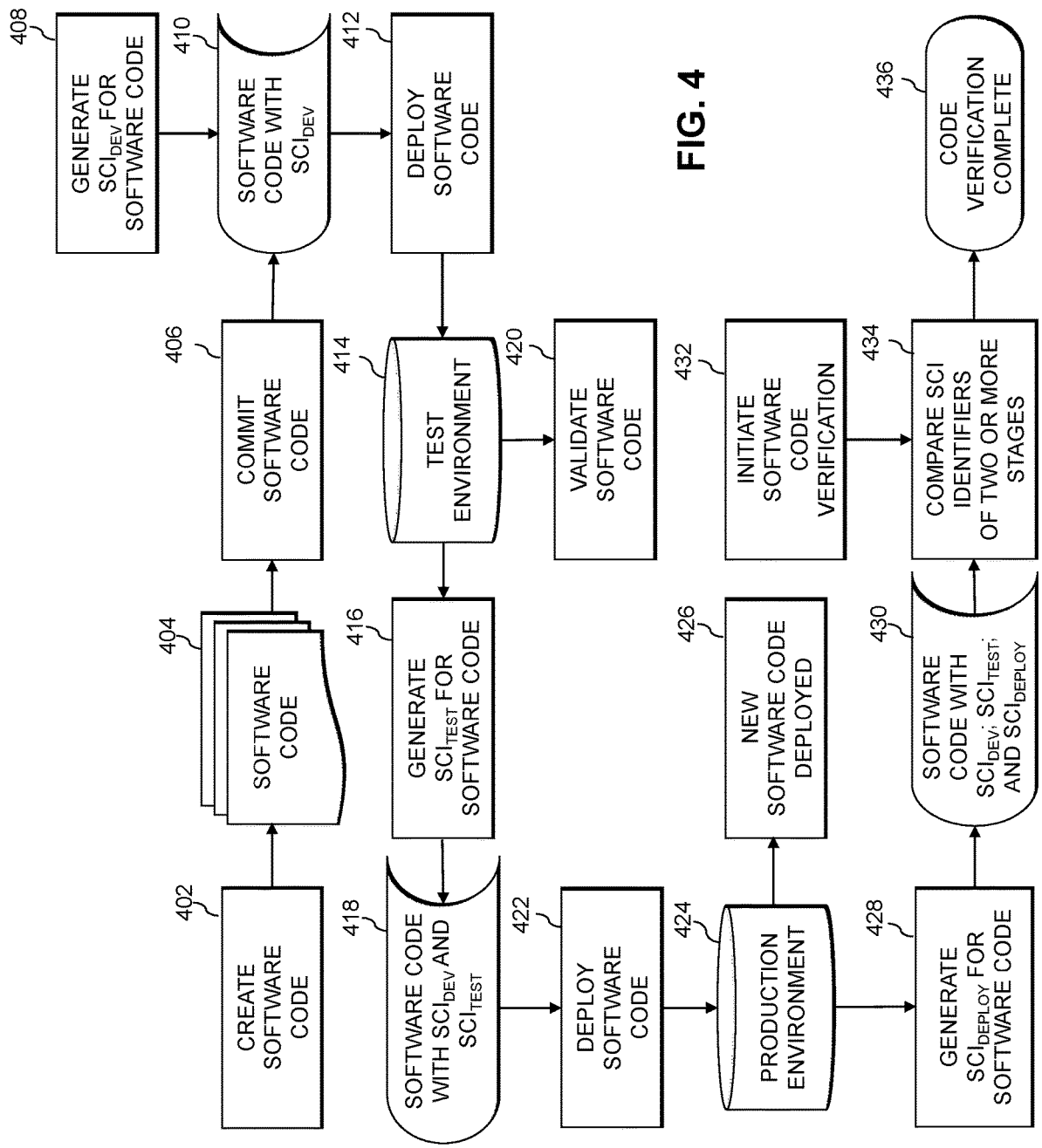
FIG. 4 is a flow chart illustrating a process for software code verification, in accordance with an illustrative embodiment.

FIG. 4 is a flow chart illustrating a process for software code verification, in accordance with an illustrative embodiment. In the example of FIG. 4, software code 404 is created in step 402, for example, as part of a software development stage. Once the software code is committed in step 406, the corresponding software code identifier, $SCI_{DEV}$, is automatically generated in step 408, and the software code is stored in a repository in step 410 along with $SCI_{DEV}$. The software code identifier, $SCI_{DEV}$, may be stored, for example, as metadata or another property of the software code.

In step 412, the software code is deployed from the repository to a test environment 414. In step 416, a software code identifier, $SCI_{TEST}$, is automatically generated for the test version of the software code and stored in a repository in step 418 along with the test version of the software code (and, optionally, with $SCI_{DEV}$).

Following step 418, there is a software code identifier, $SCI_{DEV}$, associated with the development stage and a software code identifier, $SCI_{TEST}$, associated with the testing stage. The test version of the software code may be validated in step 420, for example, by comparing $SCI_{TEST}$ to $SCI_{DEV}$. The validation is successful, for example, if the comparison indicates that the versions are the same.

In the case of compiled software code (and in other situations where one or more properties of the developed software code are modified for a run-time environment), for example, it may be expected that the software code identifier, $SCI_{DEV}$, associated with the software development stage is different than the software code identifier, $SCI_{TEST}$, associated with the software testing stage, since the developed software code (e.g., source code) will be compiled (and transformed) before deployment to the test environment. For example, a source code function that is compiled into an Oracle database as executable code may transform the original source code. Thus, the corresponding software code identifiers will not match.

Nonetheless, even in the case of compiled software code, the same software would be expected to be deployed in both the testing and deployment stages. Thus, the disclosed techniques for software code verification can be employed to verify that the software code associated with the testing and deployment stages are the same, as discussed hereinafter.

If the software code is approved during the validation performed in step 420 (or if no software code verification is needed), then the software code advances to a software deployment stage where the software code is deployed in step 422 from the repository associated with step 418 to a production environment 424. The new software code is deployed to end users in step 426.

In addition, in step 428, a software code identifier, $SCI_{DEPLOY}$, is automatically generated for the deployed version of the software code and is stored in a repository in step 430 along with the deployed version of the software code. The same repository may store the multiple software code identifiers, $SCI_{DEV}$, $SCI_{TEST}$ and $SCI_{DEPLOY}$. In addition, in at least some embodiments, the same function should be used to generate the multiple software code identifiers, $SCI_{DEV}$, $SCI_{TEST}$ and $SCI_{DEPLOY}$.

A software code verification is initiated in step 432 and the software code identifiers of two or more stages are compared in step 434. For example, the software code identifiers for the testing and deployment stages (e.g., $SCI_{TEST}$ and $SCI_{DEPLOY}$) may be compared to confirm that the software code in the deployment stage is the same software code that was tested in the testing stage. As noted above, if the software code identifiers for the testing and deployment stages are the same, then the corresponding versions of the software codes are also the same.

The software code verification completes in step 436. A successful software code verification may comprise generating a proof of authenticity and/or other supporting documentation for a compliance evaluation (e.g., specifying satisfied audit requirements).

If, however, the software code identifiers for the testing and deployment stages are not the same, then untested, unauthorized and/or malicious software code may have been deployed into a production system, and an appropriate notification, documentation and/or alert may be automatically generated.

Figure 5:
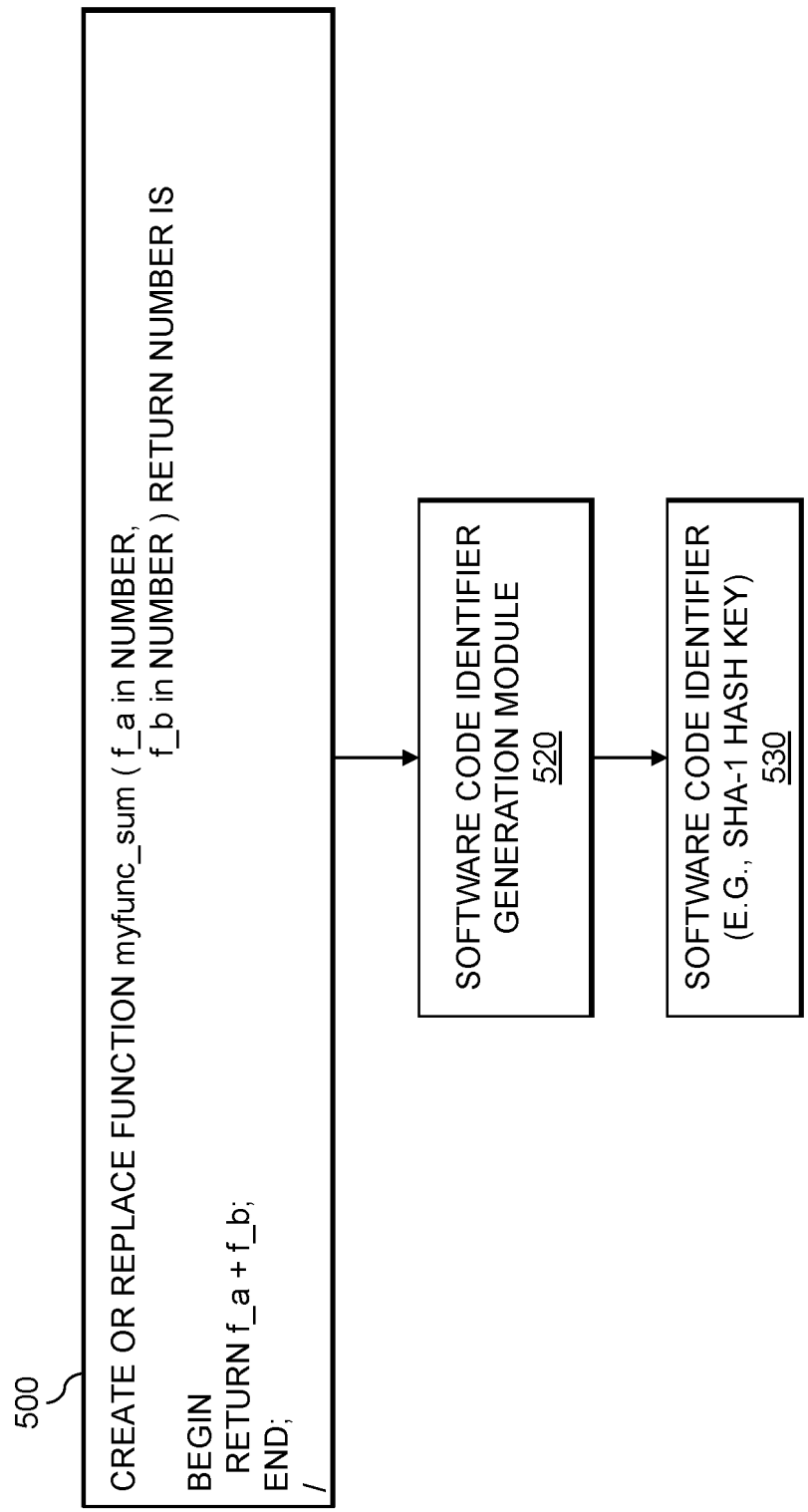
FIG. 5 illustrates an application of exemplary software code to a software code identifier generation module for generation of a software code identifier of the software code, in accordance with an illustrative embodiment.

FIG. 5 illustrates an application of exemplary software code 500 to a software code identifier generation module 520 for generation of a software code identifier 530 of the software code 500, in accordance with an illustrative embodiment. In the example of FIG. 5, the exemplary software code 500 comprises a function (e.g., a myfunc_sum function) that sums two numerical values and returns the sum as a result.

The software code identifier generation module 520 may employ, for example, a SHA-1 function to generate the software code identifier 530 for the exemplary software code 500. For example, the software code identifier generation module 520 may apply the exemplary software code 500 to a git function, hash-object, to obtain the software code identifier 530. The software code identifier 530 of the exemplary software code 500, when an SHA-1 hash function is employed, has a value of:

3fdbc60427c0f35798ad2c4904bc65c4bf4ff151.

Figure 6:
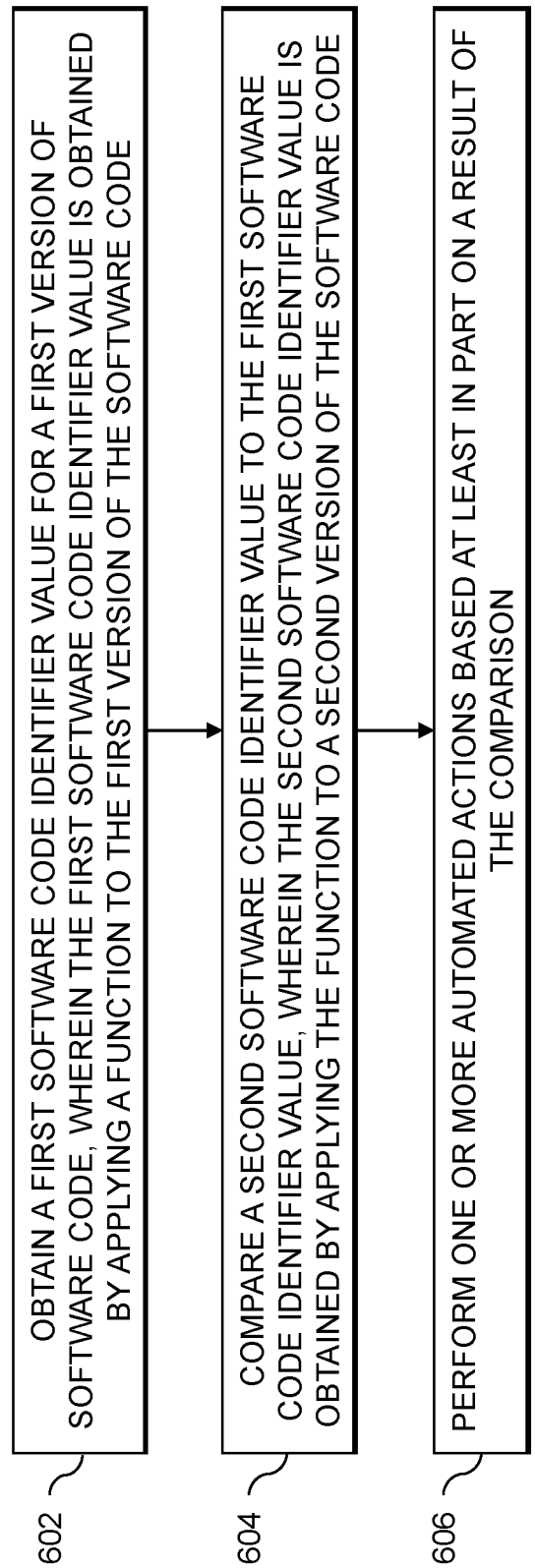
FIG. 6 is a flow chart illustrating an exemplary implementation of a process for software code verification using a comparison of software code identifiers, in accordance with an illustrative embodiment.

FIG. 6 is a flow chart illustrating an exemplary implementation of a process for software code verification using a comparison of software code identifiers, in accordance with an illustrative embodiment. In the example of FIG. 6, a first software code identifier value is obtained in step 602 for a first version of software code, wherein the first software code identifier value is obtained by applying a function to the first version of the software code.

In step 604, a second software code identifier value is compared to the first software code identifier value, wherein the second software code identifier value is obtained by applying the function to a second version of the software code.

One or more automated actions are performed in step 606 based at least in part on a result of the comparison.

In one or more embodiments, the first version of the software code may comprise software code associated with a first stage of a software development cycle and the second version of the software code may comprise software code associated with a different stage of the software development cycle. The first software code identifier value may be generated at a first time associated with a completion of the first stage, and the second software code identifier value may be generated at a second time associated with a completion of the different stage.

In some embodiments, the comparison detects a difference between the first version of the software code and the second version of the software code. The applying the function to the first version of the software code may be performed at a first time and the applying the function to the second version of the software code may be performed at a different time.

In at least one embodiment, the applying the function to the first version of the software code and the applying the function to the second version of the software code comprise (i) extracting information from the respective version, where the extracted information comprises one or more of text and binary information, and (ii) applying the function to the extracted information from the respective version.

The function may comprise a secure hash algorithm, or another function that generates a substantially unique value for an applied input. In at least some embodiments, the function generates a unique value for each of an expected number of applied inputs.

The one or more automated actions may comprise, for example: generating a validation of the software code; generating an alert; and/or generating supporting documentation for a compliance evaluation (e.g., an audit).

The particular processing operations and other network functionality described in conjunction with the flow diagrams of FIGS. 2, 4 and 6, for example, are presented by way of illustrative example only, and should not be construed as limiting the scope of the disclosure in any way. Alternative embodiments can use other types of processing operations to provide functionality for software code verification using a comparison of software code identifiers. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved software code verification techniques for detecting unexpected, untested and/or anomalous versions of software code. In this manner, the security, compliance and/or stability of software code is enhanced, such as software code developed and deployed using a CI/CD process. In addition, a mechanism is provided to protect the software code itself, as well as related data assets.

It should also be understood that the disclosed techniques for software code verification using a comparison of software code identifiers, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for software code verification using a comparison of software code identifiers may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based software code verification engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a software code verification platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
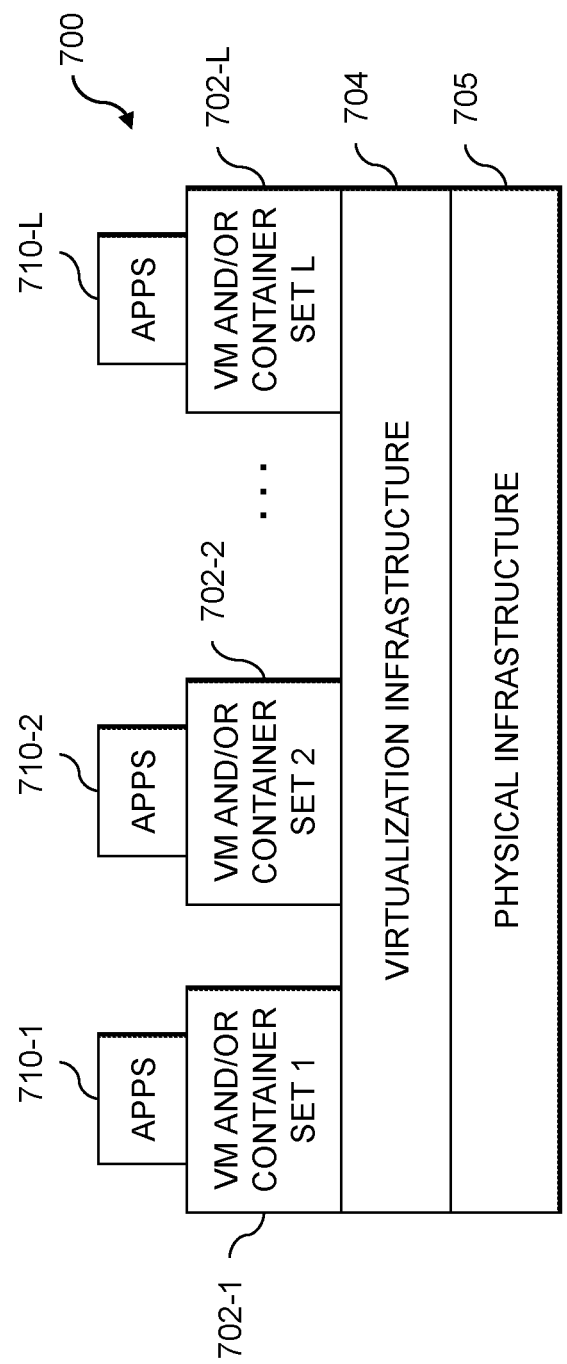
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple VMs and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide software code verification functionality of the type described above for one or more processes running on a given one of the VMs. For example, each of the VMs can implement software code verification control logic and associated software code identifier generation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide software code verification functionality of the type described above for one or more processes running on different ones of the containers. For example, a container host device supporting multiple containers of one or more container sets can implement one or more instances of software code verification control logic and associated software code identifier generation functionality.

As is apparent from the above, one or more of the processing modules or other components of system 70 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
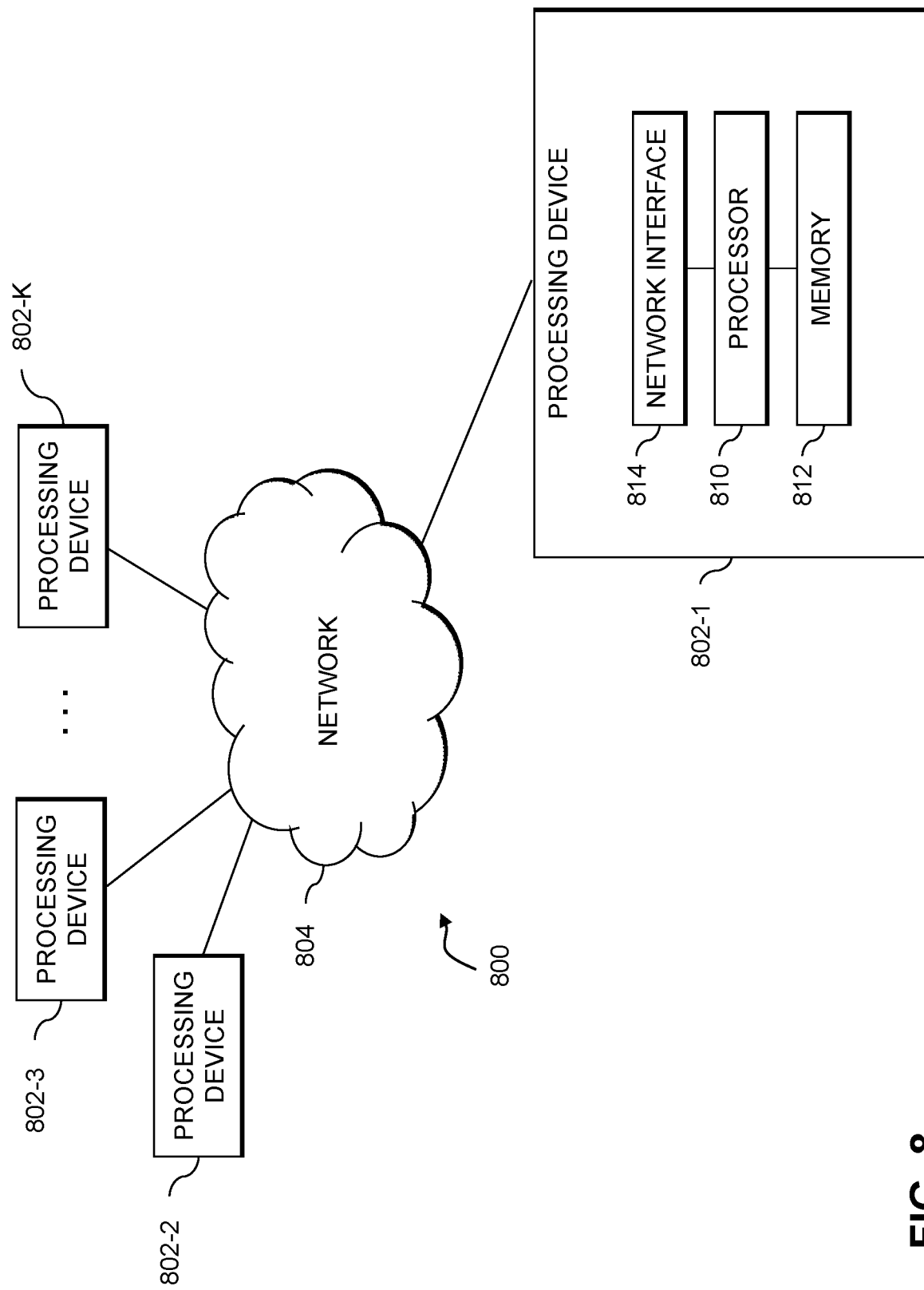
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a first software code identifier value for a first version of software code of an application, wherein the first software code identifier value is automatically generated, in response to a validation of a software testing stage of a software deployment pipeline, by applying a function to the first version of the software code;
    comparing a second software code identifier value to the first software code identifier value, wherein the second software code identifier value is automatically generated, in response to a second version of the software code of the application being deployed to a production environment during a software deployment stage of the software deployment pipeline, by applying the function to the second version of the software code of the application, wherein the comparison comprises: (i) detecting that the first version of the software code of the application is a same version of the software code as and the second version of the software code of the application and (ii) verifying that the second version of the software code of the application being deployed to the production environment is a same version of the software code as the first version of the software code of the application tested in the software testing stage; and
    performing one or more automated actions based at least in part on a result of the comparison;
    wherein the method is performed by at least one processing device comprising a processor coupled to a memory.

2. The method of claim 1, wherein the first version of the software code comprises software code associated with a first stage of a software development cycle and wherein the second version of the software code comprises software code associated with a different stage of the software development cycle.

3. The method of claim 2, further comprising generating the first software code identifier value at a first time associated with a completion of the first stage and generating the second software code identifier value at a second time associated with a completion of the different stage.

4. The method of claim 1, wherein the applying the function to the first version of the software code is performed at a first time and wherein the applying the function to the second version of the software code is performed at a different time.

5. The method of claim 1, wherein the applying the function to the first version of the software code and the applying the function to the second version of the software code comprise (i) extracting information from the respective version, wherein the extracted information comprises one or more of text and binary information, and (ii) applying the function to the extracted information from the respective version.

6. The method of claim 1, wherein the function comprises a secure hash algorithm.

7. The method of claim 1, wherein the one or more automated actions comprise one or more of: generating a validation of the software code; generating an alert; and generating supporting documentation for a compliance evaluation.

8. The method of claim 1, wherein the function generates a substantially unique value for an applied input.

9. An apparatus comprising:
    at least one processing device comprising a processor coupled to a memory;
    the at least one processing device being configured to implement the following steps:
    obtaining a first software code identifier value for a first version of software code of an application, wherein the first software code identifier value is automatically generated, in response to a validation of a software testing stage of a software deployment pipeline, by applying a function to the first version of the software code;

comparing a second software code identifier value to the first software code identifier value, wherein the second software code identifier value is automatically generated, in response to a second version of the software code of the application being deployed to a production environment during a software deployment stage of the software deployment pipeline, by applying the function to the second version of the software code of the application, wherein the comparison comprises: (i) detecting that the first version of the software code of the application is a same version of the software code as and the second version of the software code of the application and (ii) verifying that the second version of the software code of the application being deployed to the production environment is a same version of the software code as the first version of the software code of the application tested in the software testing stage; and performing one or more automated actions based at least in part on a result of the comparison.

10. The apparatus of claim 9, wherein the first version of the software code comprises software code associated with a first stage of a software development cycle and wherein the second version of the software code comprises software code associated with a different stage of the software development cycle.

11. The apparatus of claim 9, wherein the applying the function to the first version of the software code is performed at a first time and wherein the applying the function to the second version of the software code is performed at a different time.

12. The apparatus of claim 9, wherein the applying the function to the first version of the software code and the applying the function to the second version of the software code comprise (i) extracting information from the respective version, wherein the extracted information comprises one or more of text and binary information, and (ii) applying the function to the extracted information from the respective version.

13. The apparatus of claim 9, wherein the one or more automated actions comprise one or more of: generating a validation of the software code; generating an alert; and generating supporting documentation for a compliance evaluation.

14. A non-transitory processor-readable storage medium having stored therein program code of one or more software programs, wherein the program code when executed by at least one processing device causes the at least one processing device to perform the following steps:

obtaining a first software code identifier value for a first version of software code of an application, wherein the first software code identifier value is automatically generated, in response to a validation of a software testing stage of a software deployment pipeline, by applying a function to the first version of the software code;

comparing a second software code identifier value to the first software code identifier value, wherein the second software code identifier value is automatically generated, in response to a second version of the software code of the application being deployed to a production environment during a software deployment stage of the software deployment pipeline, by applying the function to the second version of the software code of the application, wherein the comparison comprises: (i) detecting that the first version of the software code of the application is a same version of the software code as and the second version of the software code of the application and (ii) verifying that the second version of the software code of the application being deployed to the production environment is a same version of the software code as the first version of the software code of the application tested in the software testing stage; and performing one or more automated actions based at least in part on a result of the comparison.

15. The non-transitory processor-readable storage medium of claim 14, wherein the first version of the software code comprises software code associated with a first stage of a software development cycle and wherein the second version of the software code comprises software code associated with a different stage of the software development cycle.

16. The non-transitory processor-readable storage medium of claim 14, wherein the applying the function to the first version of the software code is performed at a first time and wherein the applying the function to the second version of the software code is performed at a different time.

17. The non-transitory processor-readable storage medium of claim 14, wherein the applying the function to the first version of the software code and the applying the function to the second version of the software code comprise (i) extracting information from the respective version, wherein the extracted information comprises one or more of text and binary information, and (ii) applying the function to the extracted information from the respective version.

18. The method of claim 2, wherein the software development cycle transitions to a next stage in response to detecting that the first software code identifier value and the second software code identifier value are the same value.

19. The method of claim 1, wherein the at least one processing device is implemented in a software development system that processes software code in a plurality of stages of a software deployment pipeline.

20. The method of claim 1, wherein one or more of: (i) a new first software code identifier value is automatically generated in response to an update of the first version of the software code of the application following the validation of the software testing stage and (ii) a new second software code identifier value is automatically generated in response to an update of the second version of the software code of the application following the deployment of the software code of the application to the production environment.

* * * * *

UNITED STATES PATENT AND TRADEMARK OFFICE
CERTIFICATE OF CORRECTION

PATENT NO. : 12,481,498 B2  
APPLICATION NO. : 17/940452  
DATED : November 25, 2025  
INVENTOR(S) : Avila et al.

Page 1 of 1

It is certified that error appears in the above-identified patent and that said Letters Patent is hereby corrected as shown below:

In the Claims

Column 14, Line 16, in Claim 1, replace "as and the second version of the software code of the" with -- as the second version of the software code of the --

Column 15, Line 17, in Claim 9, replace "as and the second version of the software code of the" with -- as the second version of the software code of the --

Column 16, Line 12, in Claim 14, replace "as and the second version of the software code of the" with -- as the second version of the software code of the --

Signed and Sealed this  
Thirteenth Day of January, 2026

John A. Squires  
*Director of the United States Patent and Trademark Office*